United States Patent
Tsukuda et al.

(10) Patent No.: US 6,797,381 B1
(45) Date of Patent: Sep. 28, 2004

(54) HIGHLY SIZE-STABILIZED POLYMER FILM AND MAGNETIC RECORDING MEDIUM USING THE FILM

(75) Inventors: Akimitsu Tsukuda, Kyoto (JP); Toshiya Ieki, Kyoto (JP); Yuuichi Nakajima, Shiga (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/555,399

(22) PCT Filed: Sep. 28, 1999

(86) PCT No.: PCT/JP99/05301

§ 371 (c)(1),
(2), (4) Date: Jul. 27, 2000

(87) PCT Pub. No.: WO00/18564

PCT Pub. Date: Apr. 6, 2000

(30) Foreign Application Priority Data

Sep. 30, 1998 (JP) .......................................... 10/277142

(51) Int. Cl.⁷ ................................................ G11B 5/73
(52) U.S. Cl. ............... 428/409; 428/474.4; 428/694 SL
(58) Field of Search ....................... 428/694 SL, 474.4, 428/409

(56) References Cited

U.S. PATENT DOCUMENTS

| | | | | |
|---|---|---|---|---|
| 4,133,802 A | * | 1/1979 | Hachiboshi et al. ..... | 528/502 B |
| 4,645,702 A | * | 2/1987 | Asakura et al. ............ | 428/141 |
| 4,698,195 A | * | 10/1987 | Okumura et al. ......... | 264/235.8 |
| 4,798,875 A | * | 1/1989 | Itoyama et al. ............ | 525/444 |
| 4,833,019 A | * | 5/1989 | Suwarnasarn ............... | 428/336 |
| 5,603,989 A | | 2/1997 | Tomaru et al. | |
| 5,853,907 A | * | 12/1998 | Yamada et al. | |
| 5,993,938 A | * | 11/1999 | Tsukuda et al. | |
| 6,096,419 A | * | 8/2000 | Ito et al. ..................... | 428/336 |
| 6,274,220 B1 | * | 8/2001 | Tsukuda et al. | |

FOREIGN PATENT DOCUMENTS

| | | |
|---|---|---|
| DE | 19548358 A1 | 6/1996 |
| EP | 0 582 283 A1 | 2/1994 |
| JP | A6339133 | 2/1988 |
| JP | A3269817 | 12/1991 |
| JP | A63181116 | 12/1991 |
| WO | A9101210 | 2/1991 |
| WO | 9203483 | 3/1992 |
| WO | 9219522 | 11/1992 |
| WO | A9606128 | 2/1996 |
| WO | 9808892 | 3/1998 |

* cited by examiner

Primary Examiner—Stevan A. Resan
(74) Attorney, Agent, or Firm—Birch, Stewart, Kolasch & Birch, LLP

(57) ABSTRACT

A polymer film characterized in that the Poisson's ratio of the longitudinal direction (MD) to the transverse direction (TD) is less than 0.4. This film exhibits superior dimensional stability under high tension, cause almost no reading errors when it is used in a magnetic recording medium, and provides a high-capacity magnetic recording medium having superior electromagnetic conversion characteristics.

7 Claims, No Drawings

HIGHLY SIZE-STABILIZED POLYMER FILM AND MAGNETIC RECORDING MEDIUM USING THE FILM

This application is the national phase under 35 U.S.C. §371 of PCT International Application No. PCT/JP99/05301 which has an International filing date of Sep. 28, 1999, which designated the United States of America.

TECHNICAL FIELD

The present invention relates to dimensionally-stable polymer films. The present invention also relates to magnetic media using the films.

BACKGROUND ART

PET (polyethylene terephthalate) and PEN (polyethylene naphthalate) have been used as base films for magnetic recording media. Use of aromatic polyamide films having higher thermal resistance and higher rigidity in base films for magnetic recording media is also proposed. In recent years, in videotapes and magnetic recording media for recording data, trends toward higher recording capacity have been in rapid development, and the recording density and the recording area tend to increase to achieve higher recording capacity. That is, the recording wavelength has shifted to a shorter wavelength side and the track width has decreased to achieve high recording density. As a result, a change in tension during recording/reproducing and a slight change in the size of a film during a starting mode or a stopping mode cause a problem in that normal recording/reproducing is not achieved. On the other hand, due to the increase of recording/reproducing speeds on/from magnetic recording media, the tension applied to magnetic tapes has also become larger than before. The thickness of a magnetic recording medium tends to decrease to increase recording area, and thus, a base film thereof must have a significantly small thickness and high dimensional stability, which have not been achieved.

Conventional primary means for improving dimensional stability is an increase in strength of the film. For example, in thermoplastic films, such as polyester films, the strength has been improved by increasing the stretching ratio. Since the improvement in the stretching ratio approaches its limit, aromatic polyamide films and particularly para-oriented aromatic polyamide films have been studied. For example, Japanese Unexamined Patent Publication No. 62-70421 discloses an aromatic polyamide film having a tensile modulus of 1,800 kg/mm$^2$ or more in at least one direction and a coefficient of hygroscopic expansion of $8\times10^{-6}$ mm/mm/RH % or less, and a method for performing uniaxial stretching at a high stretching ratio at a high temperature in order to obtain the film. Although this method is substantially effective for improving dimensional stability in the stretching direction, the modulus and the dimensional stability in a direction perpendicular thereto are decreased in some cases, and a high level of compatibility of the dimensional stability between the longitudinal direction and the transverse direction is not achieved. Moreover, a method for ensuring dimensional stability in the transverse direction when a force is applied in the longitudinal direction has not been suggested or described. Although such an example is disclosed in Japanese Unexamined Patent Publication No. 62-70450 this method also includes the same problems.

Japanese Unexamined Patent Publication No. 59-45124 discloses an aromatic polyamide film in which the product of the heat shrinkage and the coefficient of thermal expansion is $1.0\times10^{-7}$ to $1.0\times10^{-4}$ (%/mm/mm/° C.), and Japanese Unexamined Patent Publication No. 10-222837 discloses an aromatic polyamide film having a strength of 20 to 60 kg/mm$^2$, a tensile modulus of 1,000 to 2,500 kg/mm$^2$, a heat shrinkage rate of 2% or less, and a dimensional stability at 50° C. and 80% RH % of 0.1% or less. However, these publications do not suggest nor disclose ensuring dimensional stability when a force is applied in the longitudinal direction.

Examples of the controlling the ratio of tensile moduli of the longitudinal direction to the transverse direction are Japanese Unexamined Patent Publication Nos. 56-11624 and 62-62424. Japanese Unexamined Patent Publication No. 56-11624 discloses a magnetic recording medium comprising an aromatic polyamide film, provided with a magnetic recording layer, having a tensile modulus in the transverse direction which is at least 1.3 times the tensile modulus of the longitudinal direction, for the purpose of preventing bending and wrinkling of VTR tapes. Japanese Unexamined Patent Publication No. 62-62424 discloses a magnetic recording medium comprising an aromatic polyamide film, provided with a magnetic recording layer, having a tensile modulus in the longitudinal direction which is at least 1.3 times the tensile modulus of the transverse direction, for the purpose of preventing jitter (fluctuation of images due to shrinkage/elongation of the tape) during the VTR reading mode. These examples intend improvement in dimensional stability in the transverse or longitudinal direction, but does not always ensure the dimensional stability in the direction other than the strengthened direction when an external force is applied.

That is, when a force is applied to a film, infinitesimal deformation of the film will occur not only in the direction of the force but also in a direction perpendicular to the direction of the force. In order to ensure superior write/read characteristics as a high-density magnetic recording medium, deformation not only in the direction of the force but also in a direction perpendicular to the direction of the force must be strictly controlled. Balance between physical parameters, such as tensile modulus, heat shrinkage rate, and coefficient of hygroscopic expansion, which has been conventionally performed, has already reached its limits.

The present inventors have carefully observed a change in size of a film when a force is applied and have discovered that such a behavior significantly contributes to the performance of the magnetic recording medium, and that a change in size in the direction which is perpendicular to the direction to which a force is applied can be controlled by fundamentally reinvestigating film manufacturing conditions which have been considered to be directly and exclusively determined depending on the polymer (particularly in the aromatic polyamide).

It is an object of the present invention, for solving the above problems based on such knowledge, to provide a polymer film (specifically an aromatic polyamide film) having high dimensional stability and a magnetic recording medium having electromagnetic conversion characteristics which cause always no reading errors in a reproducing mode.

DISCLOSURE OF INVENTION

The present invention relates to a polymer film characterized by a Poisson's ratio of the film of the transverse direction (TD) to the longitudinal direction (MD) of less than 0.4.

BEST MODE FOR CARRYING OUT THE INVENTION

Examples of polymer films of the present invention include polyamides, polyimides, polyesters, polycarbonates, polyacetates, polyacrylates, polyacrylonitrile, polyvinyl alcohol, polyalkylene resins, fluorinated resins, and paraphenylenebenzobisoxazole. In particular, polyamides, and more particularly, aromatic polyamides, are preferable polymers because a film having high rigidity and a specific Poisson's rate which are essential in the present invention is easily obtained.

Aromatic polyamides contain preferably at least 50 molar percent, and more preferably, at least 70 molar percent, of repeating units represented by the following general formula (I) and/or general formula (II).

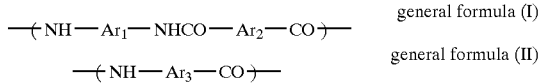

wherein $Ar_1$, $Ar_2$, and $Ar_3$, each is, for example,

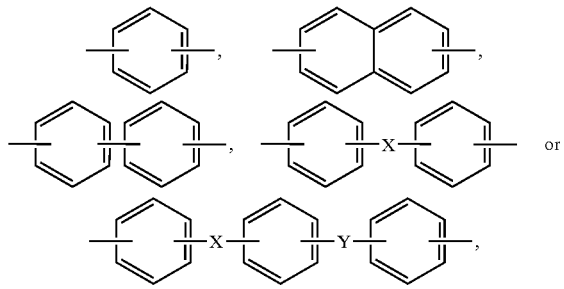

and X and Y, each is selected from —O—, —CH$_3$—, —CO—, —SO$_2$—, —S—, —C(CH$_3$)$_2$—, or the like, but is not limited thereto. In addition, parts of these aromatic rings may be substituted with a halogen, such as chlorine, fluorine, or bromine (particularly chlorine); a nitro group; an alkyl group, such as a methyl group, an ethyl group, or a propyl group (particularly methyl group); organ alkoxy group, such as an ethoxy group, a methoxy group, a propoxy group, or an isopropoxy group. The hydrogen in the amide bond of the polymer may be substituted with a substituent group.

A polymer in which at least 50%, and more preferably, at least 75%, of aromatic rings are bonded at para-positions with respect to all the aromatic rings is preferred in order to obtain a film having good dimensional stability and high elastic modulus. A polymer containing at least 30%, and more preferably, at least 50%, of aromatic rings in which part of the hydrogen atoms are substituted with a halogen (particularly chlorine) with respect to all the aromatic rings is preferred in order to decrease moisture absorption.

The aromatic polyamide contains at least 50 molar percent of the repeating unit represented by the general formula (I) and/or general formula (II), and less than 50% of other repeating units may be copolymerized or blended.

In the present invention, the Poisson's ratio of the film of the transverse direction (TD) to the longitudinal direction (MD) must be less than 0.4. Since the change in size of the film in the transverse direction due to a change in tension is significant at a Poisson's ratio of 0.4 or more, unsuccessful reproducing due to track displacement will occur and curling, so-called cupping, of the film toward the magnetic surface may be significant when the film is a metal evaporated magnetic recording medium. Such phenomena are significant when the base film is 4.5 μm or less. Although the lower limit of the Poisson's ratio is not particularly limited, a film having a Poisson's ratio of less than 0.1 may break when it is used in a system having high bearing stress and high tension of the magnetic tape on a head.

In the film in accordance with the present invention, the Poisson's ratio is more preferably in a range of 0.1 to less than 0.3 in order to achieve both the above dimensional stability and toughness. A film having a Poisson's ratio in this range is useful as a substrate of a magnetic tape which is used in a system having high bearing stress and high tension of the magnetic tape on a head, for example, a helical-scanning drive using a magneto inductive head.

In the film in accordance with the present invention, in view of dimensional stability and preventing cupping the Poisson's ratio is most preferably in a range of 0.01 to less than 0.1. Although a film having a Poisson's ratio of less than 0.1 may cause breakage of a tape when bearing stress and tension of the tape is high as described above, when the tape is used in a system using a magnetoresistive head which can suppress the bearing stress and tension, the tape exhibits high dimensional stability without breakage.

The film in accordance with the present invention preferably has a tensile modulus in at least one direction of at least 7 GPa, since the film can facilitate easy handling, and exhibits satisfactory head contact ensuring superior electromagnetic conversion characteristics when the film is used in a magnetic recording medium. The tensile modulus is more preferably at least 8 GPa and most preferably at least 10 GPa in all directions. The upper limit of the Young's modulus is not limited and is preferably approximately 25 GPa to maintain balance between the Young's modulus and elongation.

In the film of the present invention, when the ratio $E_{TD}/E_{MD}$ of the tensile moduli of the transverse direction to the longitudinal direction is in a range of $$0.8 < E_{TD}/E_{MD} < 3,$$

more satisfactory write/read characteristics are achieved. A $E_{TD}/E_{MD}$ ratio in a range of $1 < E_{TD}/E_{MD} < 2$ is more preferable.

When the coefficient of thermal expansion of the film of the present invention is in a range of $-1 \times 10^{-5}$ to $4.0 \times 10^{-5}$ a change in size with temperature is small. When such a film is used in a magnetic recording medium, the medium has satisfactory recording/reproducing characteristics.

The heat shrinkage at 200° C. (for 5 minutes) of the film of the present invention is preferably 3% or less at least in one direction, more preferably in all directions. When thermal dimensional stability is outside of this range, deterioration of planarity, such as curling, will easily occur in the processing steps of the product. In addition, a change in size is significant when it is stored at high temperatures. Such a change is not preferable in view of recording/reproducing characteristics.

It is preferable that the coefficient of hygroscopic expansion of the film of the present invention be $10 \times 10^{-5}$ or less, since a change in size due to a change in humidity and moisture absorption is small and satisfactory recording/reproducing characteristics are achieved when it is used in a magnetic recording medium.

The film of the present invention may contain particles to improve lubricancy. Although the size and the content of the particles used may be determined depending on use, the average primary particle size is preferably 0.001 to 2 μm. The content of the particles contained in the film is preferably 0.001% to 5% by weight, and more preferably 0.05% to 3% by weight. When the size or content of the particles exceeds the above range, a magnetic tape formed of the film unsatisfactorily comes into contact with a magnetic head, resulting in deterioration of electromagnetic conversion characteristics. When the size or content of the particles is less than the above range, a magnetic tape formed of the film running characteristics of the film exhibits unsatisfactory running characteristics and is undesirable in view of durability. Examples of particles include inorganic particles, e.g., $SiO_2$, $TiO_2$, $Al_2O_3$, $CaSO_4$, $BaSO_4$, $CaCO_3$, carbon black, zeolite, and metal fine particles; and organic polymers, e.g., silicon particles, polyimide particles, crosslinked copolymer particles, crosslinked polystyrene particles, and Teflon particles. Another method for improving the lubricancy of the film, other than the addition of particles, may be blending of a foreign polymer with the base polymer and then formation of protrusions of the foreign polymer during the film-forming step.

The surface roughness of the film is appropriately determined depending on use. In use in magnetic recording, the surface roughness is 2 to 500 nm, and more preferably 3 to 300 nm, as an $R_p$ value, 0.1 to 100 nm, and more preferably 0.2 to 50 nm, as an $R_a$ value, and 2 to 500 nm, and more preferably 3 to 400 nm, as an $R_z$ value.

The moisture absorption of the film of the present invention is preferably 3.5% or less and more preferably 2.5% or less. When the moisture absorption exceeds 3.5%, the dimensional stability is readily deteriorated by a change in humidity, resulting in deterioration of planarity, such as curling and wrinkling, and deterioration of electromagnetic conversion characteristics of the magnetic tape.

The elongation of the film of the present invention is preferably at least 10%, and more preferably at least 20%, so that the tape exhibits appropriate flexibility and superior processability.

The film of the present invention may be a single-layered film or a multi-layered film.

The film of the present invention can be used not only as a base film for a magnetic recording medium but also in flexible print circuits, thermal transfer ribbons, and capacitors and so on.

When the film is used as a base film for a magnetic recording medium, a magnetic layer is formed on one side or both sides to form the magnetic recording medium.

Methods for forming a magnetic layer of a magnetic tape include wet processes in which ferromagnetic powder of iron oxide, chromium oxide, Fe, Co, Fe—Co, Fe—Co—Ni, or Co—Ni is applied as magnetic coatings using various binders onto substrate films, and dry processes such as evaporation processes, sputtering processes, and ion plating processes.

After the magnetic layer is provided, a back-coat layer may be provided in order to improve running characteristics of a back face away from the magnetic layer.

The film provided with the magnetic layer is split into a predetermined width to form magnetic recording media.

The thickness of the film used in the present invention is preferably 0.5 to 50 µm, more preferably 1 to 20 µm, and most preferably 2 to 10 µm. In particular, for magnetic recording media, the thickness is preferably 6.5 µm or less, more preferably 4.5 µm or less, and most preferably 3.5 µm or less. A magnetic tape having a width of 2.2 to 15 mm and a recording density (in a noncompression mode) of 15 kilobytes/mm$_2$ as a magnetic recording medium more effectively exhibits the advantages of the present invention. The recording density is preferably at least 25 kilobytes/mm$_2$, and more preferably at least 34 kilobytes/mm$_2$.

The resulting magnetic recording media are preferably used for consumer or professional media such as 8-mm or digital video cassettes, broadcasting media including D-1, D-2, and D-3, and data storage media, such as DDS-2, DDS-3, DDS-4, QIC, data 8-mm, and DLT, but are not limited to these. In particular, the magnetic recording media are preferably used for data storage which requires reliability such as data omission.

Recording systems for magnetic recording media using the film of the present invention are linear systems and helical scanning systems. In particular, the tape of the present invention is advantageous when it is used in recording media for helical scanning type magnetic recording having a complicated tape path in which a significantly large tension is applied to the tape so that the tape tightly surrounds a rotating read/write head.

A method for making a film of the present invention will now be described with reference to examples of aromatic polyamides among a polymer group which are suitable for achieving the object of the present invention, but the present invention is not limited thereto.

When an aromatic polyamide is formed of an acid chloride and a diamine, it is synthesized by solution polymerization in an aprotic organic polar solvent, such as N-methylpyrrolidone (NMP), dimethylacetamide (DMAc), or dimethylformamide (DMF), or by interfacial polymerization using an aqueous medium. When the acid chloride and the diamine are used as monomers, hydrogen chloride is formed as a byproduct in the polymer solution. When it is neutralized, inorganic neutralizing agents, such as calcium hydroxide, calcium carbonate, and lithium carbonate, and organic neutralizing agents, such as ethylene oxide, propylene oxide, ammonia, triethylamine, triethanolamine, and diethanolamine are used. When the aromatic polyamide is prepared by a reaction of isocyanate with a carboxylic acid, the reaction is performed in an aprotic organic polar solvent in the presence of a catalyst.

These polymer solutions may be used as stock solutions for film production. Alternatively, after isolating the polymer, the polymer may be dissolved into one of the above organic solvents or an inorganic solvent such as sulfuric acid to prepare a polymer stock solution.

In order to obtain the aromatic polyamide film of the present invention, the intrinsic viscosity η inh of the polymer is preferably at least 0.5 (dl/g), wherein the intrinsic viscosity is measured at 30° C. using a solution of 0.5 g of polymer in 100 ml of 98% sulfuric acid.

Particles can be added as follows. After forming a slurry of particles in a solvent, the solution is used as a polymerization solution or for dilution. Alternatively, particles may be directly added to a stock solution for film production.

The stock solution for film production may contain an organic salt, such as calcium chloride, magnesium chloride, lithium chloride, or lithium nitrate, as a solubilizer. A preferable concentration of the polymer in the stock solution is approximately 2 to 40 percent by weight.

From the stock solution prepared as above, films are formed by so-called solution casting processes. The solution casting processes are classified into a dry-wet process, a dry process, and a wet process, and any process can be employed. When the polymer solution contains an inorganic salt, a wet process is necessary for extracting the salt, and thus the dry-wet process or the wet process is employed.

When the film is formed by the dry-wet process, the stock solution is extruded from a die onto a support such as a drum and an endless belt to form a thin film and the solvent is removed from the thin film until the polymer concentration (PC) reaches 35 to 60 percent by weight so that the thin film exhibits self sustaining property.

After the drying step, the film is cooled, peeled off from the support, and then introduced into a wet bath for the subsequent wet process to remove the salt and the solvent. The composition of the wet bath may be any poor solvent for the polymer, for example, water or a mixture of an organic solvent and water. The ratio of the organic solvent to water in the mixture is 70:30 to 0:100 and preferably 60:40 to 30:70 in order to facilitate the formation of the target film. The wet bath may contain an inorganic salt, but the solvent and the inorganic salt contained in the film are preferably extracted using a large amount of water.

The film from the wet step is then dried and annealed in a tenter.

The resulting film is stretched in the tenter during the dry step in the film production process in order to achieve a target Poisson's ratio and to improve mechanical properties and dimensional stability. Stretching may be performed by a successive biaxial stretching in which the film is stretched in the longitudinal direction and then in the transverse direction or in the transverse direction and then in the longitudinal direction, or by a simultaneous biaxial stretching in which the film is simultaneously stretched in the longitudinal and transverse directions. These stretching methods are well known as stretching methods in melt film production which has been performed when a film of polyethylene, polypropylene, or polyester is formed. In a case of the film of the present invention which is prepared by solution film production, the film contains a solvent and components of the wet bath, and the process includes their movement to the exterior of the film. Thus, a particular method is necessary in order to obtain a target film. A successive biaxial stretching is preferable in view of the apparatus and operation. Selection of optimized stretching conditions is required depending on the polymer composition, the stretching ratio of the film in the longitudinal direction is preferably 1.0 to 2.0 times, and the stretching velocity is preferably 1 to 100%/sec. Also, it is preferable that the stretching ratio in the transverse direction be 1.1 to 3.0 times, the stretching velocity be 10 to 100%/sec, and the stretching temperature be 200 to 350° C. When the stretching temperature is lower than 200° C. or when the stretching velocity is higher than 100%/sec, the Poisson's ratio decreases or the film will readily break during the stretching. When the stretching temperature is higher than 350° C. or when the stretching velocity is less than 10%/sec, the target Poisson's ratio is barely obtained. The areal stretching ratio is preferably in a range of 1.0 to 3.0 wherein the areal stretching ratio is defined as the area of the film after stretching divided by the area of the film before stretching. It is preferable that the stretching velocity $V_{MD}$ in the longitudinal direction and the stretching velocity $V_{TD}$ in the transverse direction satisfy $2V_{MD}<V_{TD}$ in order to achieve a target Poisson's ratio.

After stretching, the film is subjected to annealing, and the annealing is preferably performed at 200 to 450° C. for 1 second to 5 minutes. When the annealing temperature is below this temperature, crystallization is insufficient for achieving satisfactory mechanical properties. When the above ranges are exceeded, the film exhibits brittleness and does not withstand practical use.

In addition to the above method, the introduction of partial intermolecular crosslinks in the polymer structure also can preferably achieve a Poisson's ratio of less than 0.1. When this method is applied to a para-oriented polymer and particularly a para-oriented aromatic polyamide, the Poisson's ratio can be suppressed to the limit by a synergistic effect with rigidity which is inherent in the para-oriented aromatic polyamide. Specifically, a tri-functional or higher-functional monomer is introduced in an amount of 0.01 to 5 molar percent and preferably 0.1 to 1.5 molar percent. Regarding the functionality, tri-functional monomer is preferable, since the reaction preferably proceeds and the effects of the unreacted groups are moderated. When the content is less than 0.01 molar percent, the Poisson's ratio may not be decreased in some cases. When the content exceeds 5 molar percent, mechanical properties are deteriorated. Examples of such monomers include 1,3,5-triaminobenzene, 1,2,4,5-tetraaminobenzene, 1,3,5-trimellitoyl chloride, and 1,2,4,5-pyromellitoyl chloride.

The film in accordance with the present invention may be a laminated film. For example, in an example of methods for forming a double-layered film, an aromatic polyamide solution is divided into two parts, different particles are added to the individual parts, and then lamination is performed. A similar process is also applied to a triple-layered or multi-layered film. Lamination can be performed by well-known processes, for example, lamination in a die, lamination using feed block, and formation of a first layer and then formation of another layer thereon.

The film in accordance with the present invention is obtained as above, but is not limited thereto. In production of the film of the present invention composed of a polymer other than the aromatic polyamide, a method suitable for the polymer is used. [Methods for measuring physical properties and evaluating effects]

Methods for measuring physical properties and evaluating the effects of the present invention are as follows.
(1) Poisson's Ratio The measurement is performed according to the following method.

(1) A film is cut into a dumbbell shape to prepare a sample. The longitudinal direction of the film is the longitudinal direction (stretching direction) of the sample. A square mesh pattern having a side of 2 mm is printed on the sample using a PRINT-GOKKO device or a pen.

(2) The sample is mounted into a manual stretcher and stretched (in the longitudinal direction) until the sample breaks.

(3) Distortion of the mesh pattern during the stretching process is observed at a magnification of 50 times using a digital microscope (KEYENCE-6200) and is recorded using a Hi-8 video recorder.

(4) The recorded image is analyzed using image analysis software (TOYOBO-V10) to measure a distance between lines in the mesh pattern and measure the distortion $\gamma_{MD}$ in the stretching direction and the distortion $\gamma_{TD}$ perpendicular to the stretching direction.

(5) The ratio $\gamma_{TD}/\gamma_{MD}$ when the distortion $\gamma_{MD}$ is 0.05 is defined as the Poisson's ratio.

Regarding the method for measuring the Poisson's ratio, refer to a strain gauge process described in Jikken Kagaku Koza (Experimental Chemistry Course), "Polymer Materials," volume 29, page 37; a digital image correlation method described in Extended Abstract of 25th Stress-Strain Measurement Symposium, pages 75 to 80; and an ultrasonic method described in "Ultrasonic Determination of Mechanical Moduli of Oriented Semicrystalline Polymers" Polymer Engineering and Science, vol. 37, No. 11, pp. 1833 to 1844, November 1997.
(Modulus)

The modulus is measured at a sample width of 10 mm, a sample length of 50 mm, and a stretching velocity of 300 mm/min using a tensilometer made by Orientech Co., Ltd.
(3) Output Characteristics A magnetic paint having the following composition is applied onto the film by a gravure roller, is magnetically oriented, and is then dried. Then it is calendered through a compact test calender unit (steel roller/nylon roller, 5 steps), and is then cured at 70° C. for 48 hours. The film is slit into 1/2 inch pieces to prepare pancake.
(Composition of Magnetic Paint)

| | |
|---|---|
| Co-containing iron oxide | 100 parts by weight |
| Vinyl chloride/vinyl acetate copolymer | 10 parts by weight |
| Polyurethane elastomer | 10 parts by weight |
| Polyisocyanate | 5 parts by weight |
| Lecitin | 1 part by weight |
| Methyl ethyl ketone | 75 parts by weight |
| Methyl isobutyl ketone | 75 parts by weight |
| Toluene | 75 parts by weight |
| Carbon black | 2 parts by weight |
| Lauric acid | 1.5 parts by weight |

The magnetic tape is loaded into a tape cassette to prepare a testing tape cassette. Using the resulting testing tape cassette and a helical scanning rotary head, signals of a recording wavelength of 0.45 μm are recorded onto the magnetic tape, and the output (reading output) when these are reproduced is measured. The output is represented by a relative value when the output of a magnetic tape of Comparative Example 1, as a reference tape, is 100%, and a relative value of 99% or more is defined as a satisfactory level.

(4) Error Rate of Tape

The magnetic tape is loaded into a tape cassette, and the error rates of the tape are measured 20 times each at running speeds of the tape of 100 inch/sec and 200 inch/sec in a continuous running mode under the conditions of 30° C. and 65% RH using a magneto inductive helical scanning rotary head. The average thereof is calculated to determine the difference of the error rate between 200 inch/sec and 100 inch/sec, and a difference of the error rate of 0.10 (/MB) is defined as a satisfactory level. The tension applied to the tape at the running speed of 200 inch/sec was two times that at the running speed of 100 inch/sec.

EXAMPLES

Embodiments of the present invention will now be described based on the following Examples.

Example 1

Into N-methyl-2-pyrrolidone (NMP), 85 molar percent of 2-chloro-p-phenylenediamine, as an aromatic diamine component, and 15 molar percent of 4,4'-diaminodiphenyl ether were dissolved, 98.5 molar percent of 2-chloroterephthaloyl chloride was added thereto, and the mixture was stirred for 2 hours to complete the polymerization. The mixture was neutralized with lithium hydroxide. An aromatic polyamide solution having a polymer content of 10.5 percent by weight and a viscosity of 3,500 poise was prepared. Into the solution, 2.0 percent by weight of dry-processed silica having a primary particle size of 16 nm was added.

After the polymer solution was filtrated using a filter, it was cast onto an endless belt from a T die. The solvent was evaporated by hot air at 160° C., and a film of a polymer content of 45 percent by weight exhibiting self sustaining property was continuously peeled off from the belt. Next, the film was introduced into a wet bath of NMP/water=30/70 at a temperature of 50° C. for 5 minutes to extract the residual solvent, and the inorganic salt and impurities which were formed by the neutralization, while the film was stretched between nip rollers in the longitudinal direction at a stretching ratio of 1.20 times and a stretching velocity of 5%/sec. The film was then introduced into a water bath at 50° C. for 5 minutes to extract the solvent. The film was stretched using a tenter in the transverse direction at a stretching velocity of 18%/sec and a stretching ratio of 1.40 times while being dried and annealed at 280° C., and was then slowly cooled to prepare a film having a thickness of 4.4 $\mu$m.

The Poisson's ratio of this film was 0.26, and the tensile moduli in the longitudinal direction (MD) and the transverse direction (TD) were 12 GPa and 14 GPa, respectively. The relative output of a magnetic tape which was prepared using this film was 100% and was satisfactory. The error rate was 0.2 (/MB) at both 100 inch/sec and 200 inch/sec, and thus the magnetic tape was a satisfactory tape having reduced reading errors under high-speed running.

Examples 2 and 3

Using the polymer solution of Example 1, films were prepared by the process of Example 1 under the conditions shown in Table 1. The relative outputs and error rates of magnetic tapes using these films were satisfactory, according to the results shown in Table 1.

Example 4

After polyethylene terephthalate chips (intrinsic viscosity of 0.65 dl/g, 2.0 percent by weight of dry process silica having a primary particle size of 16 nm was contained) was dried at 180° C. for 8 hours under a reduced pressure (3 Torr), the chips were fed into an extruder to melt the chips at 280° C. After the polymer was subjected to high-precision filtration, it was extruded and solidified onto a casting drum at a surface temperature of 25° C. by an electrostatic casting process to prepare an unstretched film. The film was stretched to a stretching ratio of 3.3 times at 95° C. at a stretching velocity of 50%/sec in the longitudinal direction in two steps using two groups of nip rollers. Using a tenter, the film was then stretched in the transverse direction to a stretching ratio of 4 times at a stretching velocity of 110%/sec and at a temperature of 105° C., and then to a stretching ratio of 1.3 times (total 5.2 times) at 120° C. The film was annealed at 200° C. for 4 seconds at a fixed length. A film having a thickness of 8 $\mu$m was prepared.

The Poisson's ratio of this film was 0.38, and the tensile moduli in the longitudinal direction (MD) and the transverse direction (TD) were 5 GPa and 7.5 GPa, respectively. The relative output of a magnetic tape which was prepared using this film was 99% and was satisfactory. The error rate was 0.3 (/MB) at 100 inch/sec and 0.4 (/MB) at 200 inch/sec, and thus the magnetic tape was a satisfactory tape having reduced reading errors under high-speed running.

No film breakage occurred during the measurement of the error rate in Examples 1 to 4.

Example 5

Into N-methyl-2-pyrrolidone (NMP), 90 molar percent of 2-chloro-p-phenylenediamine, as an aromatic diamine component, 9 molar percent of 4,4'-diaminodiphenyl ether, and 1 molar percent of 1,3,5-triaminobenzene were dissolved, 99 molar percent of 2-chloroterephthaloyl chloride was added thereto, and the mixture was stirred for 2 hours to complete the polymerization. The mixture was neutralized with lithium hydroxide. An aromatic polyamide solution having a polymer content of 11 percent by weight and a viscosity of 3,800 poise was prepared. Into the solution, 2.0 percent by weight of dry-processed silica having a primary particle size of 16 nm was added.

After the polymer solution was filtrated using a filter, it was cast onto an endless belt from a T die. The solvent was evaporated by hot air at 160° C., and a film of a polymer content of 40 percent by weight exhibiting self sustaining property was continuously peeled off from the belt. Next, the film was introduced into a wet bath of NMP/water=30/70 at a temperature of 50° C. for 5 minutes to extract the residual solvent, and the inorganic salt and impurities which were formed by the neutralization, while the film was stretched between nip rollers in the longitudinal direction at a stretching ratio of 1.15 times and a stretching velocity of 3%/sec. The film was then introduced into a water bath at 50° C. for 5 minutes to extract the solvent. The film was stretched using a tenter in the transverse direction at a stretching velocity of 30%/sec and a stretching ratio of 1.55 times while being dried and annealed at 290° C., and was then slowly cooled to prepare a film having a thickness of 4.4 $\mu$m.

The Poisson's ratio of this film was 0.06, and the tensile moduli in the longitudinal direction (MD) and the transverse direction (TD) were 10 GPa and 20 GPa, respectively. The relative output of a magnetic tape which was prepared using this film was 120% and was satisfactory. The error rate was 0.1 (/MB) at both 100 inch/sec and 200 inch/sec, and thus the magnetic tape was a satisfactory tape having reduced reading errors under high-speed running. Since the film broke one time when the error rate was measured at a high speed (200 inch/sec), the tension of the film was reduced to a quarter and running test were repeated 20 times. The film did not break.

Example 6

Into N-methyl-2-pyrrolidone (NMP), 90 molar percent of 2-chloro-p-phenylenediamine as an aromatic diamine component, 5 molar percent of 4,4'-diaminodiphenyl ether, and 5 molar percent of 1,3,5-triaminobenzene were dissolved, 99.4 molar percent of 2-chloroterephthaloyl chloride was added thereto, and the mixture was stirred for 2 hours to complete the polymerization. The mixture was neutralized with lithium hydroxide. An aromatic polyamide solution having a polymer content of 11 percent by weight and a viscosity of 3,800 poise was prepared. Into the solution, 2.0 percent by weight of dry-processed silica having a primary particle size of 16 nm was added.

After the polymer solution was filtrated using a filter, it was cast onto an endless belt from a T die. The solvent was evaporated by hot air at 160° C., and a film of a polymer content of 40 percent by weight exhibiting self sustaining property was continuously peeled off from the belt. Next, the film was introduced into a wet bath of NMP/water=30/70 at a temperature of 50° C. for 5 minutes to extract the residual solvent, and the inorganic salt and impurities which were formed by the neutralization, while the film was stretched between nip rollers in the longitudinal direction at a stretching ratio of 1.2 times and a stretching velocity of 3%/sec. The film was then introduced into a water bath at 50° C. for 5 minutes to extract the solvent. The film was stretched using a tenter in the transverse direction at a stretching velocity of 50%/sec and a stretching ratio of 1.6 times at 230° C. and annealed at 450° C. to prepare a film having a thickness of 8 μm.

The Poisson's ratio of this film was 0.008, and the tensile moduli in the longitudinal direction (MD) and the transverse direction (TD) were 12 GPa and 22 GPa, respectively. The relative output of a magnetic tape which was prepared using this film was 115% and was satisfactory. The error rate was 0.05 (/MB) at both 100 inch/sec and 200 inch/sec, and thus the magnetic tape was a satisfactory tape having reduced reading errors under high-speed running. Since the film broke two times when the error rate was measured at a low speed (100 inch/sec) and two times when the error rate was measured at a high speed (200 inch/sec), the tension of the film was reduced to a quarter and running test were repeated 20 times. The film broke one time.

Comparative Example 1

The same polymer as that in Example 1 was filtrated using a filter and was cast onto an endless belt from a T die. The solvent was evaporated by hot air at 160° C., and a film of a polymer content of 50 percent by weight exhibiting self sustaining property was continuously peeled off from the belt. Next, the film was introduced into a wet bath of NMP/water=10/90 at a temperature of 40° C. for 5 minutes to extract the residual solvent, and the inorganic salt and impurities which were formed by the neutralization, while the film was stretched between nip rollers in the longitudinal direction at a stretching ratio of 1.10 times and a stretching velocity of 10%/sec. The film was introduced into a water bath at 50° C. for 5 minutes to extract the solvent. The film was stretched using a tenter in the transverse direction at a stretching velocity of 15%/sec and a stretching ratio of 1.20 times while being dried and annealed at 220° C., and was then slowly cooled to prepare a film having a thickness of 4.4 μm.

The Poisson's ratio of this film was 0.40, and the tensile moduli in the longitudinal direction (MD) and the transverse direction (TD) were 12 GPa and 8 GPa, respectively. The relative output of a magnetic tape which was prepared using this film was 100% and was satisfactory. The error rate was 0.3 (/MB) at 100 inch/sec and was 0.45 (/MB) at 200 inch/sec, and thus the magnetic tape was an unsatisfactory tape having significant reading error under high-speed running.

Comparative Example 2

Into N-methyl-2-pyrrolidone (NMP), 50 molar percent of 2-chloro-p-phenylenediamine as an aromatic diamine component, and 50 molar percent of 4,4'-diaminodiphenyl ether were dissolved, 98.5 molar percent of isophthaloyl chloride was added thereto, and the mixture was stirred for 2 hours to complete the polymerization. The mixture was neutralized with lithium hydroxide. An aromatic polyamide solution having a polymer content of 13 percent by weight and a viscosity of 3,800 poise was prepared. Into the solution, 2.0 percent by weight of dry-processed silica having a primary particle size of 16 nm was added.

After the polymer solution was filtrated using a filter, it was cast onto an endless belt from a T die. The solvent was evaporated by hot air at 160° C., and a film of a polymer content of 45 percent by weight exhibiting self sustaining property was continuously peeled off from the belt. Next, the film was introduced into a wet bath of NMP/water=30/70 at a temperature of 50° C. for 5 minutes to extract the residual solvent, and the inorganic salt and impurities which were formed by the neutralization, while the film was stretched between nip rollers in the longitudinal direction at a stretching ratio of 1.2 times and a stretching velocity of 0.7%/sec. The film was introduced into a water bath at 50° C. for 5 minutes to extract the solvent. The film was stretched using a tenter in the transverse direction at a stretching velocity of 20%/sec and a stretching ratio of 1.30 times while being dried and annealed at 200° C., and was then slowly cooled to prepare a film having a thickness of 4.4 μm.

The Poisson's ratio of this film was 0.41, and the tensile moduli in the longitudinal direction (MD) and the transverse direction (TD) were 8 GPa and 10 GPa, respectively. The relative output of a magnetic tape which was prepared using this film was 94% and was unsatisfactory. The error rate was 0.25 (/MB) at 100 inch/sec and was 0.45 (/MB) at 200 inch/sec, and thus the magnetic tape was an unsatisfactory tape having significant reading errors under high-speed running.

Comparative Example 3

After the same polyethylene terephthalate chips as that in Example 4 was dried at 180° C. for 8 hours under a reduced pressure (3 Torr), the chips were fed into an extruder to melt the chips at 280° C. After the polymer was subjected to high-precision filtration, it was extruded and solidified onto a casting drum at a surface temperature of 25° C. by an electrostatic casting process to prepare an unstretched film. The film was stretched to a stretching ratio of 3.3 times at 95° C. at a stretching velocity of 70 %/sec in the longitudinal direction in two steps using two groups of nip rollers. Using a tenter, the film was stretched in the transverse direction to a stretching ratio of 4 times at a stretching velocity of 50%/sec and at a temperature of 105° C., and was then stretched in the longitudinal direction to a stretching ratio of 1.45 times at 115° C. (total 4.8 times in the longitudinal direction). The film was annealed at 200° C. for 4 seconds at a fixed length. A film having a thickness of 8 μm was prepared.

The Poisson's ratio of this film was 0.42, and the tensile moduli in the longitudinal direction (MD) and the transverse direction(TD) were 7.8 GPa and 4.5 GPa, respectively. The relative output of a magnetic tape which was prepared using this film was 90% and was unsatisfactory. The error rate was 0.35 (/MB) at 100 inch/sec and 0.55 (/MB) at 200 inch/sec, and thus the magnetic tape was a satisfactory tape having reduced reading error.

wherein Ar1, Ar2, and Ar3 are each independently

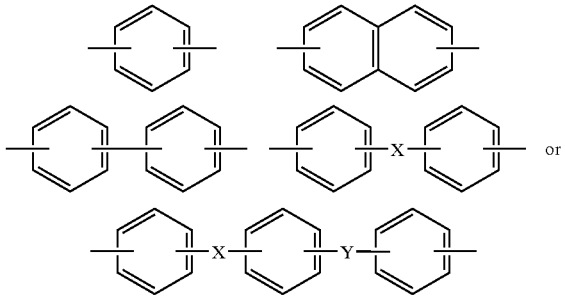

TABLE 1

| | Polymer | Stretching Ratio (Times) (MD/TD) | Stretching Velosity (%/sec) (VTD/VMD) | Stretching Velosity Ratio (VTD/VMD) | Tensile Modulus (GPa) (ETD/EMD) | Poisson's Ratio | Relative Output (%) | Error Rate (/MB) 100 inch/sec | 200 inch/sec | (200 inch/sec) − (100 inch/sec) |
|---|---|---|---|---|---|---|---|---|---|---|
| Example 1 | Aromatic Polyamide | 1.20/1.40 | 18/5 | 3.6 | 14/12 | 0.26 | 110 | 0.2 | 0.2 | 0.00 |
| Example 2 | Aromatic Polyamide | 1.30/1.25 | 17/7 | 2.4 | 12.5/13.5 | 0.31 | 105 | 0.25 | 0.3 | 0.05 |
| Example 3 | Aromatic Polyamide | 1.10/1.45 | 20/3 | 6.7 | 16/11 | 0.23 | 115 | 0.2 | 0.2 | 0.00 |
| Example 4 | Polyethylene Terephthalate | 3.3/5.2 | 110/50 | 2.2 | 7.5/5 | 0.38 | 99 | 0.3 | 0.4 | 0.10 |
| Example 5 | Aromatic Polyamide | 1.15/1.55 | 30/3 | 10 | 20/10 | 0.06 | 120 | 0.1 | 0.1 | 0.00 |
| Example 6 | Aromatic Polyamide | 1.2/1.6 | 50/3 | 16.7 | 22/12 | 0.008 | 122 | 0.05 | 0.05 | 0.00 |
| Comparative Example 1 | Aromatic Polyamide | 1.10/1.20 | 15/10 | 1.5 | 8/11 | 0.40 | 100 | 0.3 | 0.45 | 0.15 |
| Comparative Example 2 | Aromatic Polyamide | 1.2/1.3 | 20/0.7 | 28.5 | 10/8 | 0.41 | 94 | 0.25 | 0.45 | 0.20 |
| Comparative Example 3 | Polyethylene Terephthalate | 4.8/4.0 | 50/70 | 0.7 | 4.5/7.8 | 0.42 | 90 | 0.35 | 0.55 | 0.20 |

INDUSTRIAL APPLICABILITY

A magnetic recording medium using a polymer film of the present invention having a specific Poisson's ratio and high dimensional stability causes almost no reading errors during high-speed recording/reproducing and thus exhibits superior electromagnetic conversion characteristics. Since the film has superior dimensional stability, higher capacity can be achieved by decreasing the recording wavelength, decreasing the track pitch. The film in accordance with the present invention can be used not only in magnetic recording but also in fields which require dimensional stability, such as flexible print circuits, capacitors, and thermal transfer ribbons and so on.

What is claimed is:

1. An aromatic polyamide film characterized in that the Poison's ratio of the traverse direction (TD) to the longitudinal direction (MD) is less than 0.4, and wherein a tensile modulus at least in one direction is at least 7 Gpa wherein at least 50 molar percent of the repeating units are represented by the following formulas (I) and/or (II)

 formula (I)

 formula (II)

and X and Y are each selected from the group selected from —O—, —CH$_2$—, —CO—, —SO$_2$—, —S—, —C(CH$_3$)$_2$—, and wherein the rings represented in formulas (I) and (II) may optionally be substituted with a halogen, a nitro group, an alkyl group, an alkoxy group, and wherein the hydrogen in the amide group may be substituted with a substituent group.

2. The aromatic polyamide film according to claim 1, wherein the Poison's ratio is 0.1 to less than 0.3.

3. The aromatic polyamide film according to claim 1, wherein the Poison's ratio is 0.01 to less than 0.1.

4. The aromatic polyamide film according to claim 1, wherein the ratio of $E_{TD}/E_{MD}$ of the tensile moduli of the transverse direction to the longitudinal direction satisfies:

$$0.8 < E_{TD}/E_{MD} < 3.$$

5. A magnetic recording medium comprising a film according to any one of claim 1, 2, 3, or 4 provided with a magnetic layer on at least one side.

6. A magnetic recording material according to claim 5, used in helical scanning type magnetic recording.

7. The aromatic polyamide film according to claim 1 wherein the film is stretched at a temperature of from 200 to 350° C.

* * * * *